United States Patent
Lindsey et al.

(10) Patent No.: US 6,952,439 B1
(45) Date of Patent: Oct. 4, 2005

(54) SYSTEM FOR, AND METHOD OF, TRANSMITTING DATA FROM A TRANSMITTER TO A RECEIVER AND RECOVERING THE DATA AT THE RECEIVER

(75) Inventors: William C. Lindsey, Pasadena, CA (US); Young M. Kim, L.A., CA (US)

(73) Assignee: The Titan Corporation, San Diego, CA (US)

( * ) Notice: Subject to any disclaimer, the term of this patent is extended or adjusted under 35 U.S.C. 154(b) by 506 days.

(21) Appl. No.: 09/687,024

(22) Filed: Oct. 13, 2000

(51) Int. Cl.[7] .............................................. H04B 1/707
(52) U.S. Cl. .................................................... 375/140
(58) Field of Search ............................... 375/130, 135, 375/136, 142, 143, 146, 147, 150, 151, 140, 375/141, 295, 316

(56) References Cited

U.S. PATENT DOCUMENTS

| | | | | |
|---|---|---|---|---|
| 5,204,876 A | * | 4/1993 | Bruckert et al. | 375/130 |
| 5,345,469 A | * | 9/1994 | Fulghum | 370/342 |
| 5,748,668 A | * | 5/1998 | Tomita et al. | 375/130 |
| 5,781,542 A | * | 7/1998 | Tanaka et al. | 370/342 |
| 6,111,868 A | * | 8/2000 | Lee et al. | 370/342 |
| 6,160,840 A | * | 12/2000 | Park | 375/141 |
| 6,366,601 B1 | * | 4/2002 | Ghosh et al. | 375/130 |

* cited by examiner

*Primary Examiner*—Kevin Burd
(74) *Attorney, Agent, or Firm*—Ellsworth R. Roston; Fulwider Patton, et al.

(57) ABSTRACT

Data at a transmitter is modulated, in accordance with instructions from a receiver, to provide M different modulations in successive sequences. N spreading codes are also provided in successive sequences at the transmitter, in accordance with instructions from the receiver, alternately with the M data modulations. The alternate sequences of the M data modulations and the N spreading codes are paired and individual ones of the M data modulations and the N spreading codes in the paired sequences are combined (e.g. multiplied). The paired combinations of the individual ones of the M data modulations and the N spreading codes are transmitted to the receiver, which uses correlation or matched filter techniques to recover each combination of the individual one of the data modulations and the individual one of the spreading codes. A single spreading code may be used instead of the N spreading codes.

85 Claims, 6 Drawing Sheets

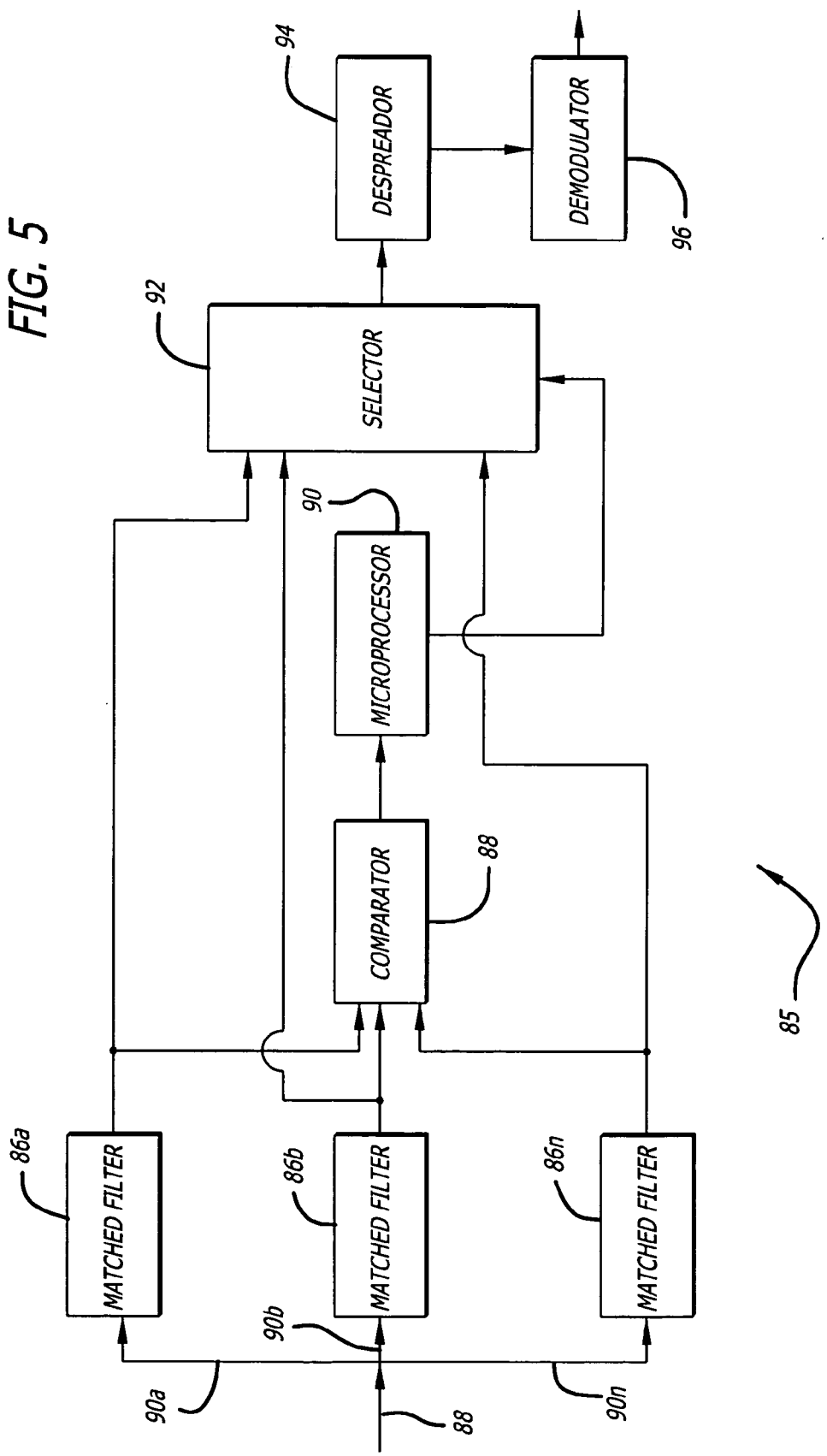

SYSTEM FOR, AND METHOD OF, TRANSMITTING DATA FROM A TRANSMITTER TO A RECEIVER AND RECOVERING THE DATA AT THE RECEIVER

This invention relates to systems for, and methods of, transmitting data from a transmitter to a receiver. The systems and methods of this invention provide for a transmission and reception of data with a greater accuracy than the systems and methods of the prior art.

BACKGROUND OF A PREFERRED EMBODIMENT OF THE INVENTION

In systems now in use, digital data is transmitted from a transmitter to a receiver. The digital data received at the receiver is not easily recognized. This results in part from noise produced in the transmission of the data from the transmitter to the receiver. It also results in part from the fact that the digital data travels in different paths from the transmitter to the receiver. For example, the digital data preferably travels directly from the transmitter to the receiver. However, the digital data can also travel from the transmitter to positions misaligned with the transmitter and the receiver and then travel from the misaligned positions to the receiver.

This misalignment causes the data received at the receiver from the misaligned position to be out of phase with the signals passing directly from the transmitter to the receiver. This out-of-phase relationship makes it difficult to recover the data at the receiver. The problem is aggravated because the receiver can often receive the same data from a number of different misaligned positions in addition to the data passing directly from the transmitter to the receiver. The misalignment can cause the data transmitted from the transmitter to the receiver to fade because the phases of the misaligned signals are such that the amplitudes of the misaligned signals are subtracted from the amplitude of the signals translated directly from the transmitter to the receiver.

Attempts have been made to alleviate the problems of recovering data at the receiver when the data has been blurred by noise and by misalignments in phase. For example, in systems now in use for sending digital data from a controlled station (e.g., a transmitting station) to a controlling station (e.g., a receiving station), the digital data is provided with repetitive sequences of M modulations where M is a constant. Each of the M data modulations in each sequence is different from the other ones of the M modulations in the sequence. The M data modulations at the transmitter are provided in accordance with instructions from the controlling station (e.g. receiver). The modulated data is transmitted from the transmitter to the receiver in packets. In a first packet or sequence of packets, the data may be modulated with a first one of the M data modulations. In a second packet or sequence of packets, the data may be transmitted with a second one of the M data modulations. In a third one of the packets or sequence of packets, the data may be transmitted with a third one of the M data modulations.

In other systems now in use, the digital data in each packet or sequence of packets may be transmitted from the transmitter to the receiver at individual ones of N spreading codes. For example, the modulated data in a first one of the packets or sequence of packets may be transmitted from the transmitter to the receiver at a first one of the N different spreading codes. The data in a second one of the packets or sequence of packets may then be transmitted from the transmitter to the receiver at a second one of the N spreading codes rates. The data in a third one of the packets or sequence of packets may be subsequently transmitted from the transmitter to the receiver at a third one of the N spreading codes. Each spreading code may provide for a transmission of the data at a different rate. The N different spreading codes may be provided in accordance with instructions from the receiver.

The systems now in use and discussed in the previous paragraphs have reduced the problem of recovering data at a receiver, but have not solved the problem. It is still difficult to recover data at a receiver because of the proliferation in the reception at the receiver of out-of-phase data which clouds the reception and recovery of the in-phase data.

Several documents can be considered as prior art to the invention disclosed and claimed in this application. These are as follows:

(a) U.S. Pat. No. 5,541,955 issued on Jul. 30, 1996, to Jacobsmeyer for an Adaptive Data Rate Modem;

(b) An article-published on-pages 927–946 of the May, 1998, issue of IEEE Transaction on Information Theory. This article was written by Giusepper Caire et al and was entitled "Bit-Interleaved Coded Modulation";

(c) An article published on pages 54–64 of the January, 2000, issue of IEEE Communications magazine. This article was written by Sanjiv Nanda et al and was entitled "Adaption Techniques in Wireless Packet Data Services";

(d) An article published on pages 2223–2230 of the July, 1995, issue of IEEE Transactions on Communications. This article was written by W. Webb and R. Steel and was entitled "Variable Rate QAM for Mobile Radio"; and (e) An article published on pages 1218–1230 in the October, 1997, issue of IEEE Transactions on Communications. This article was written by A. Goldsmith and S. Chaa and was entitled "Variable-Rate Variable-Power MQAM for Fading Channels".

The prior art references specified above in paragraphs (a) through (e) disclose systems for modulating data and also disclose systems for providing spreading codes. However, they do not disclose systems for providing a combination of data modulations and spreading codes. They further do not disclose systems which provide channel encodings with either data modulations or spreading codes or both data modulations and spreading codes. There is also no disclosure in the prior art specified above of particular techniques of combining data modulations and spreading codes to provide an optimal detection of the data even when the data is obscured by considerable amounts of multi-path fading.

BRIEF DESCRIPTION OF PREFERRED EMBODIMENTS OF THE INVENTION

Data at a transmitter is modulated, in accordance with instructions from a receiver, to provide M different modulations in successive sequences. N spreading codes are also provided in successive sequences at the transmitter, in accordance with instructions from the receiver, alternately with the M data modulations. The alternate sequences of the M data modulations and the N spreading codes are paired and individual ones of the M data modulations and the N spread codes in the paired sequences are combined (e.g. multiplied).

Alternatively, an individual one of the M data modulations is combined (e.g. multiplied) with an individual one of the N spreading codes in the adjacent sequence. The modulator and the spreader may be included at the transmitter with (a) a channel encoder which provides channel coding in accordance with instructions from the receiver, (b) a puncturer which removes particular data in accordance with instructions from the receiver and (c) an interleaver.

The paired combinations of the individual ones of the M data modulations and the spreading codes are transmitted to the receiver, which uses correlation or matched filter techniques to recover each combination of the individual one of the data modulations and the individual one of the spreading codes. The recovered data is de-spread in accordance with instructions from the receiver, demodulated in accordance with instructions from the receiver and de-interleaved. The particular data punctured from the sequence is re-inserted and the data is then decoded in accordance with the instructions from the receiver.

BRIEF DESCRIPTION OF THE DRAWINGS

In the drawings:

FIG. 5 is a circuit diagram, primarily in block form, of a system constituting another preferred embodiment of the invention for receiving the data in the novel format from the transmitter shown in any of FIGS. 1–3 and for recovering the data;

DETAILED DESCRIPTION OF A PREFERRED EMBODIMENTS OF THE INVENTION

Figure 1:
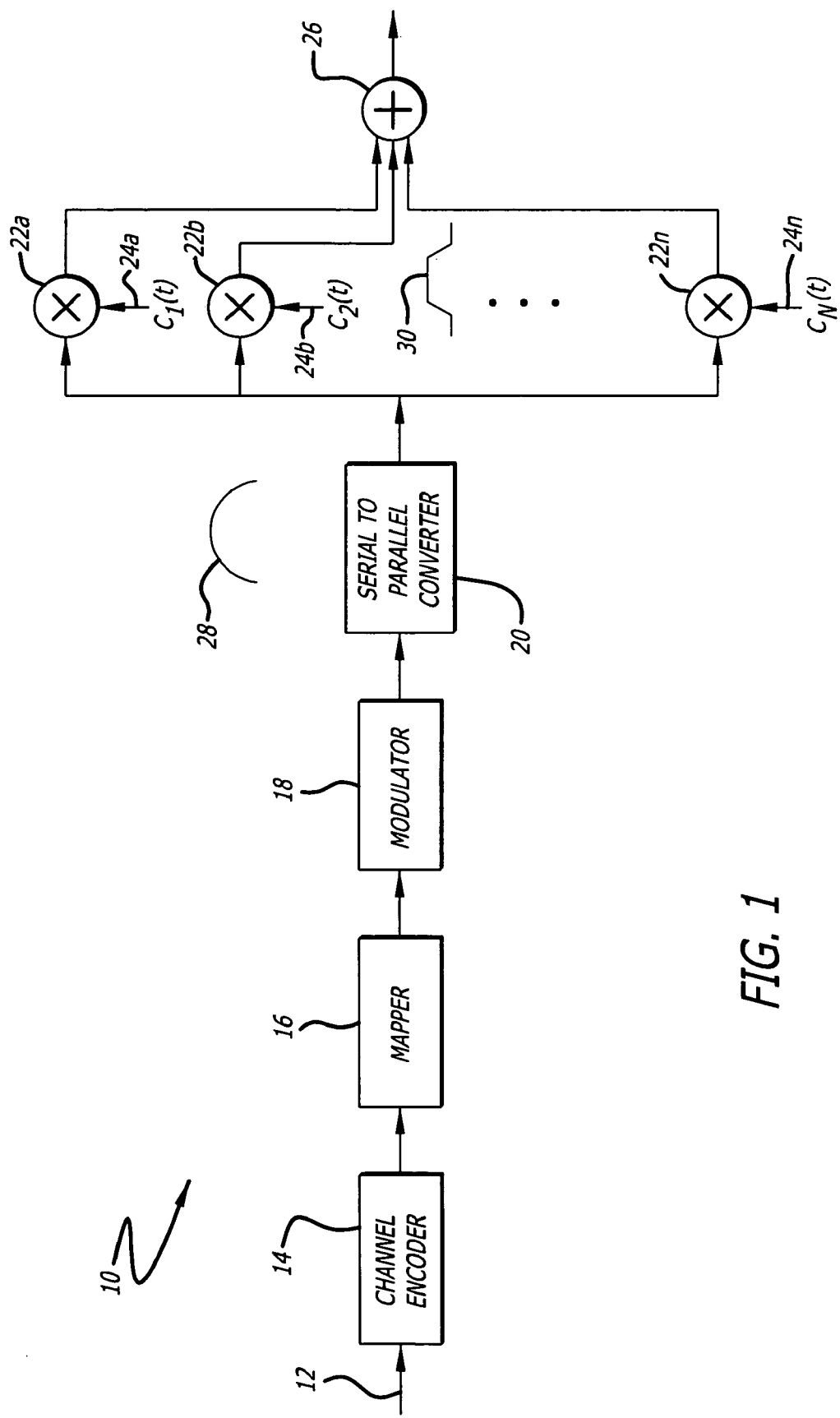
FIG. 1 is a schematic circuit diagram, primarily in block form, of one preferred embodiment of the invention for transmitting data in a particular format to a receiver.

FIG. 1 schematically illustrates a system, primarily in block form and constituting a preferred embodiment of the invention, for sending data in digital form in a particular format from a transmitter (generally indicated at 10) to a receiver. The transmitter 10 includes a bus 12 for providing data input in a binary form. A channel encoder 14 may convert each binary signal to a number of binary bits indicating the different channels in which the data is provided. The inclusion of the channel encoder 14 is preferable but not mandatory.

The binary signals in the channel encoder 14 are introduced to a mapper 16. The mapper 16 provides binary indications identifying each of the channels. For example, the paired binary indications 01 could represent an upper right quadrant. Alternatively, the paired binary indications 01 could represent a lower left quadrant. The inclusion of the mapper 16 is preferable but is not mandatory.

The signals from the mapper 16 are modulated by a modulator 18. The modulations may be in a number of different forms each known in the prior art. For example, the modulations may be in the form of quadrature amplitude modulation (QAM), quadrature phase shift keying (QPSK) or star quadrature amplitude modulations (SQAM). The QAM modulations may illustratively be in 16 QAM (where four (4) positions are provided in each of four (4) quadrants) or in 64 QAM (where sixteen (16) positions are provided in each of the four (4) quadrants.

A plurality of different modulations (e.g, M) are provided by the modulator 18. The M different modulations are produced respectively on a sequential basis of successive packets of digital signals. For example, a first modulation may be produced in a first packet or in a successive number of packets. A second modulation may then be produced in a second packet or in a successive number of packets. Successive modulations may be sequentially produced in successive packets, or successive numbers of packets, until the M different modulations are produced. Thereafter, the cycle of M successive modulations is repeated for the packets in successive sequences on a repetitive basis.

The signals from the bus 12, the channel encoder 14, the mapper 16 and the modulator 18 are in serial form. They are converted to a parallel form by a serial-to-parallel converter 20 in a manner well known in the prior art. The parallel signals from the converter 20 are introduced to a plurality of multiplier stages respectively designated as 22a, 22b . . . 22n. Each of the multipliers 22a, 22b . . . 22n also respectively receives an individual one of a plurality of N spreading code signals on an individual one of lines 24a, 24b . . . 24n.

Each of the N spreading codes respectively provided on an individual one of the lines 24a . . . 24n may be produced at a different rate from the rate produced by the other ones of the N spreading codes. Thus, the multiplier 22a may multiply the modulated data $S_1(t)$ and the spreading code $C_1(t)$ where $S_1$ represents the first one of the M different data modulations and $C_1(t)$ represents the first one of the N spreading codes. Similarly, the multiplier 22b may multiply the modulated data $S_2(t)$ and the spreading code $C_2(t)$. An adder 26 receives the outputs from the multipliers 22a, 22b . . . 22n. An amplifier may be included in the adder 26.

The data modulations $S_1(t)$ . . . $S_m(t)$ have a bandwidth indicated at 28 in FIG. 1. The spreading code signals $C_1(t)$ . . . $C_n(t)$ have a bandwidth 30 which may be considerably larger than the bandwidth 28. The increased bandwidth 30 is advantageous in that it decreases noise in the transmitted and received signals and decreases the disadvantageous effects of out-of-phase signals. The out-of-phase signals are particularly disadvantageous because they can decrease the magnitude of the signals transmitted directly from the transmitter to the receiver. This results from the fact that the phases of the out-of-phase signals may be directly opposite to the phase of the directly transmitted signal. Because of this, the increased bandwidth provided by the N spreading codes facilitates the recovery at the receiver of the in-phase data provided at the transmitter and transmitted directly to the receiver. The increased bandwidth is disadvantageous in that it slows the transmission of data from the transmitter to the receiver.

As will be disclosed in detail subsequently, it is known in the prior art to change one of the data modulations and the spreading codes without simultaneously changing the other one. However, it is not known in the prior art to change simultaneously the data modulations and spreading codes. Simultaneously changing both the data modulations and the spreading codes offers certain advantages. It strengthens the signals transmitted directly from the transmitter to the receiver against fading resulting from multi-path transmissions from the transmitter to the receiver. However, there is also a disadvantage. This may be seen from the relative bandwidths of the data modulations and the spreading codes. The data modulations have a bandwidth indicated at 28 in FIG. 1 and the spreading codes have a bandwidth indicated at 30. As will be seen, the bandwidth 30 is significantly greater than the bandwidth 28. The increased bandwidth 30 facilitates the recovery of the data transmitted from the transmitter directly to the receiver from the fading resulting from multi-path passages of the data from the transmitter to the receiver. However, the increased range of the bandwidth 30 slows the transmission of data from the transmitter to the receiver.

Figure 2:
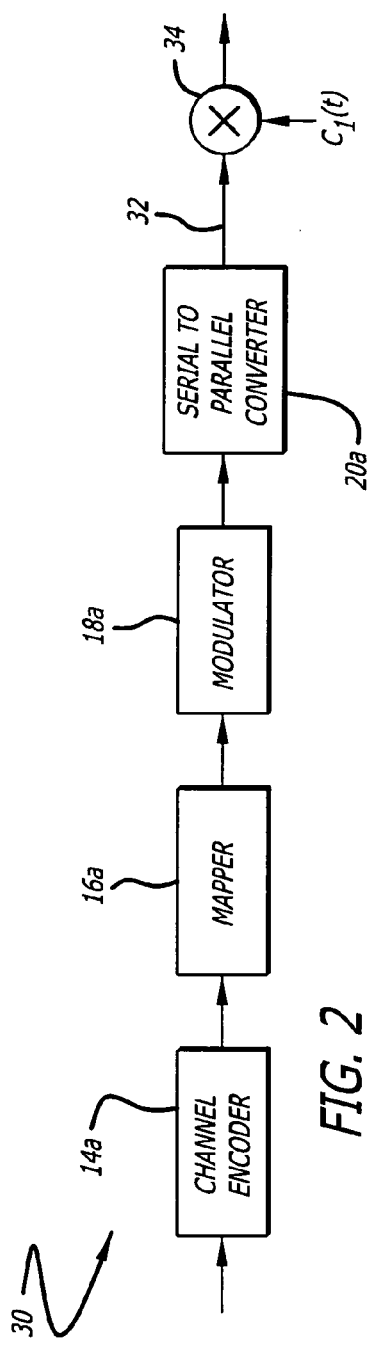
FIG. 2 is a schematic circuit diagram, primarily in block form, of another preferred embodiment of the invention for transmitting data in another format to a receiver.

FIG. 2 schematically shows another system, generally indicated at 31 and primarily in block form, for sending data in a particular format from a transmitter to a receiver. The system 31 is designated as a single code system because there is only a single spreading code $C_1(t)$. This causes the rate of the orthogonal signals generated by the spreading code to be fixed. In this system, the number of different rates for the transmission of the data modulations is increased.

The transmitter shown in FIG. 2 may include a channel encoder 14a corresponding to the channel encoder 14, a mapper 16a corresponding to the mapper 16, a modulator 18a corresponding to the modulator 18 and a serial-to-parallel converter 20a corresponding to the serial-to-parallel converter 20. The parallel output from the converter 20 is introduced on a bus 32 to a multiplier 34 which also receives the spreading code $C_1(t)$. The transmitter shown in FIG. 2 distinguishes over the prior art in providing for sequential changes in the data modulations and combining the sequentially changed data modulations with the constant spreading code $C_1(t)$.

In the transmitter shown in FIG. 2, only the single spreading code $C_1(t)$ has been provided. Because of this, a number of the claims have been written with this in mind.

Figure 3:
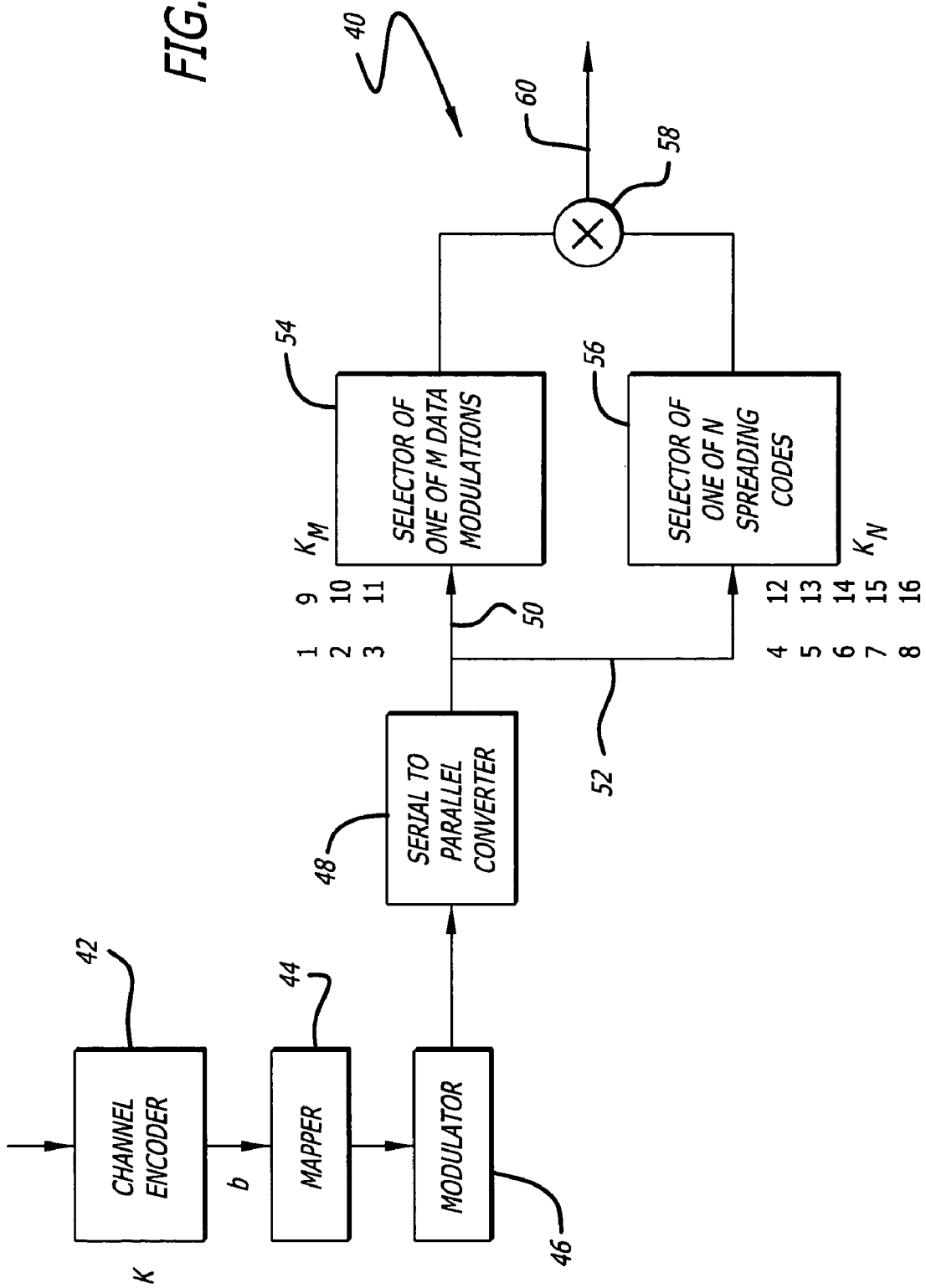
FIG. 3 is a schematic circuit diagram, primarily in block form, of a third preferred embodiment of the invention for transmitting data in still another format to a receiver, this preferred embodiment having advantages over the embodiment shown in FIGS. 1 and 2.

FIG. 3 schematically illustrates a preferred embodiment of a transmitter, generally indicated at 40, of the invention. The transmitter 40 is primarily in block form and is preferred to the embodiments shown in FIGS. 1 and 2. The transmitter 40 includes a channel encoder 42, a mapper 44, a modulator 46 and a serial-to-parallel converter 48 respectively corresponding to the channel encoder 14, the mapper 16, the modulator 18 and the serial-to-parallel converter 20 in FIG. 1.

In the system shown in FIG. 3, assume that there are three (3) different data modulations and that there are five (5) different spreading codes. Under these circumstances, M would be 3 and N would be 5. The M data modulations are provided at the transmitter 40 in accordance with instructions from the receiver. In like manner, the N spreading codes are provided at the transmitter 40 in accordance with instructions from the receiver.

As shown in FIG. 3, the three (3) data modulations are initially presented in a sequence as represented by the numerals 1, 2, 3 and the five (5) spreading codes are then presented in a sequence as represented by the numerals 4, 5, 6, 7, 8. The three (3) data modulations are then presented again in a sequence as represented by the numerals 9, 10, 11 and the five (5) spreading codes are again presented in a sequence as represented by the numerals 12, 13, 14, 15, 16. Successive sequences of the data modulations and then the spreading codes are repeated in the manner specified above. It will be appreciated that a sequence of the successive spreading codes may be presented before a related sequence of the successive data modulation without departing from the scope of the invention.

The successive data modulations in a sequence are introduced from the serial-to-parallel converter 48 to a bus 50. This is indicated by the numerals 1, 2, 3 in a first column, and then by the numerals 9, 10, 11 in a second column, adjacent the bus 50 in FIG. 3. In like manner, the successive spreading codes in a sequence are introduced from the serial-to-parallel converter 48 to a bus 52. This is indicated by the numerals 4, 5, 6, 7, 8 below the numbers 1, 2, 3 in the first column, and then by the numerals 12, 13, 14, 15 and 16 below the numbers 9, 10, 11 in the second column.

A selector 54 is provided for selecting one (1) of the M data modulations in each data modulation sequence and a selector 56 is provided for selecting one (1) of the N different spreading codes in each spreading code sequence. The selections by the stages 54 and 56 are paired. In other words, the M data modulations indicated as 1, 2, 3 for a time m=0 are paired with the N spreading codes indicated at 4, 5, 6, 7, 8 for a time m=0. In like manner, the M data modulations indicated as 9, 10, 11 for a time m=1 are paired with the spreading codes indicated as 12, 13, 14, 15, 16 for the time m=1. The selections of the individual one of the M data modulations in each sequence and the individual one of the N spreading codes in each sequence may be made in accordance with instructions from the receiver. The selected one of the M data modulations in each sequence and the selected one of the N spreading codes in each sequence are combined as in a multiplier 58 and are introduced to a bus 60 for transmission to the receiver.

In the transmitter 40, $\log_2 M = K_m$, where

M=a constant; and $K_m$=a constant (1)

In like manner, $\log_2 N = K_n$, where

N=a constant; and $K_n$=a constant (2)

Thus $K=K_m+K_n$, where

K=a constant (3)

K indicates the number of binary bits to be provided in the encoder 42 to indicate the number of different channels to be provided for the successive stages in the transmitter.

In FIG. 3, b can be considered as the output from the channel encoder 42. Successive signals representing data modulations can be represented as $$b_1(m)=[b(mk),b(mk+1) \ldots (b(mk+K_m-1)], \text{ where} \quad (4)$$

m=a symbol time index indicated successively as 0, 1, 2, etc.

b=the output from the channel encoder 42;

$b_1$ the data modulations;

$$b_2(m)=[b(mk+K_m),b(mk+K_m 1) \ldots b(mk+k-1)], \text{ where} \quad (5)$$

$b_2$=the spreading codes.

The system shown in FIG. 3 has certain important advantages over the systems of the prior art and even over the systems shown in FIGS. 1 and 2 of this application. The system is better able to provide a distinction at the receiver between the data transmitted directly from the transmitter 40 to the receiver and phase-shifted data which limits the ability of the receiver to detect the in-phase signals from the transmitter. The system of FIG. 3 provides this distinction between the data transmitted directly to the receiver from the transmitter and the phase-shifted signals by providing M data modulations and N spreading codes. The system of FIG. 3 is also advantageous over the systems of FIGS. 1 and 2 because it is simpler than the systems shown in FIGS. 1 and 2 in selecting, for combination, only an individual one of the M data modulations in each sequence and only an individual one of the N spreading codes in each sequence. The system of FIG. 3 is also advantageous in that it simultaneously selects the individual one of the M data modulations in each sequence and the individual one of the N spreading codes in each sequence.

Figure 4:
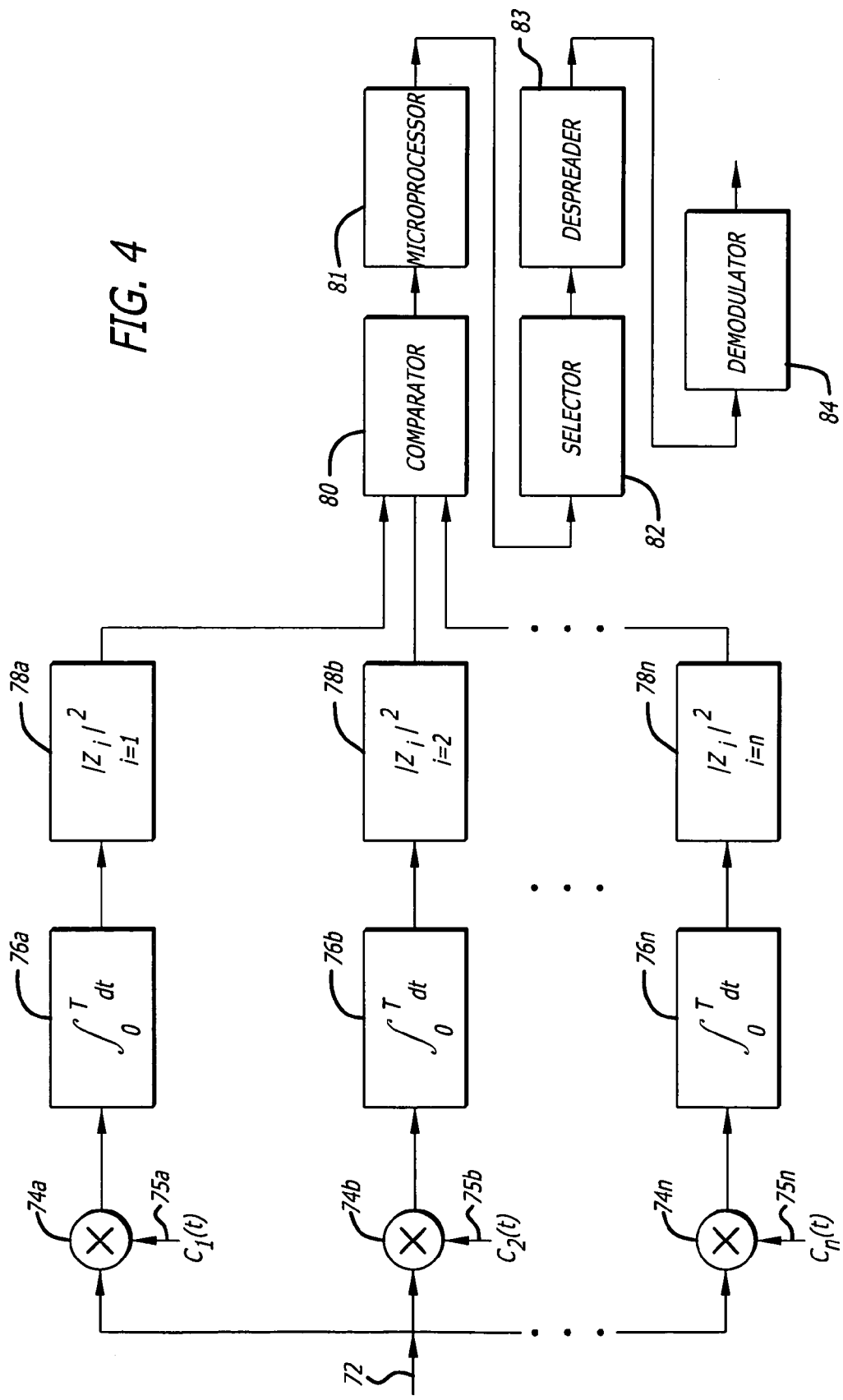
FIG. 4 is a circuit diagram, primarily in block form, of a system constituting a preferred embodiment of the invention for receiving the data in the novel format from the transmitter shown in any of FIGS. 1–3 and for recovering the data.

The modulated data from the transmitter is received at a preferred embodiment of a receiver generally indicated at 70 in FIG. 4. The receiver 70 may be of a correlator type and is shown primarily in block form. In a correlator type, the modulated data received at the receiver is introduced to a plurality of stages and is processed in a particular manner in each of these stages. The stage with the strongest signal is presumed to indicate the modulated data transmitted from the transmitter. It provides a correlation with the transmitted signal. This signal is then processed to recover the data in the modulated data transmitted to the receiver. A receiver of the correlator type is known in the art but not in the context or environment disclosed in this application and not with the combination of stages shown in FIG. 4.

The signals are received at the receiver 70 on a bus 72. The signals on the bus 72 are introduced to multipliers 74a, 74b . . . 74n. Each of the multipliers, 74a, 74b . . . 74n receives an individual one of a plurality of spreading code signals $C_1(t), C_2(t) \ldots C_n(t)$ respectively on lines 75a, 75b . . . 75n. The outputs of the multipliers 74a, 74b . . . 74n are respectively introduced to individual ones of a plurality of integrators 76a, 76b . . . 76n. Each of the integrators 76a, 76b . . . 76n integrates the output of its associated multiplier from the time 0 to the time T. Thus, for example, $$Z_1 = \int_0^T Q_1 dt, \text{ where}$$

$Q_1$=the input to the integrator 76a; and $$Z_1=\text{the output from the integrator 76}a. \quad (6)$$

In like manner, $$Z_n = \int_0^T Q_n dt, \text{ where}$$

where Qn=the input to the integrator 76n; and

Zn=the output of the integrator 76n.

The output from each of the integrators $76_a, 76_b \ldots 76_n$ is partly real and partly imaginary. To convert the output of each of the integrators, $76_a, 76_b \ldots 76_n$ to an entirely real number, the absolute value of each of the outputs is squared. This is indicated at 78a, 78b . . . 78n in FIG. 4. For example, the squaring of the output from the integrator 76a may be indicated as $\ddot{y} Z_1 \ddot{y}^2$ and the squaring of the output from the integrator 76n may be indicated as $\ddot{y} Z_n \ddot{y}^2$. A comparison is then made in a comparator 80 of the magnitudes of the different outputs from the integrators after the different integrated outputs have been squared. The individual one of the integrators 76a, 76b . . . 76n introducing integrated output to the squaring stage 78 and providing the output with the largest magnitude in the stage 78a, 78b . . . 78n is then selected by a microprocessor 81 in a selector 2 on the basis of this comparison. The selected one of the integrators 76a, 76b . . . 76n is then de-spread as at 83 to recover the modulated data. The de-spread data is then demodulated as at 84 to recover the data. The data is then analyzed on the basis of the guide lines provided by the mapper 16 and the channel encoder 14 at the transmitter to determine the significance of the data. The despreader 83 and the demodulator 84 are known in the prior art but not in the combination shown in FIG. 4 and not in the context or environment set forth in this application.

FIG. 5 illustrates another preferred embodiment, generally indicated at 85, of a receiver. The receiver may be of a matched filter type and is shown primarily in block form. Since the receiver 85 receives from the transmitter information concerning various parameters such as individual ones of the M data modulations and individual ones of the N spreading codes, the receiver may include a plurality of filters each having characteristics matching the characteristics of a combination of an individual one of the M data modulations and an individual one of the N spreading codes. The plurality of matched filters are indicated at 86a, 86b . . . 86n in FIG. 5 and are shown as receiving through a bus 88 the signals from the transmitter.

Each of the filters 86a, 86 . . . 86n also receives a signal corresponding to the output capable of being provided by an individual one of the combinations of an individual one of the M data modulations and an individual one of the N spreading codes. As previously indicated, the receiver 85 knows the M data modulations and the N spreading codes since the receiver instructs the transmitter to use these data modulations and spreading codes. Because of this, each of the filters 86a, 86b . . . 86n is able to match the characteristics of an individual one of the transmitted signals.

For example, the matched filter 86a receives signals on a line 90a. One of these signals corresponds to a combination of b(mk) and b(mk+km). The filter 86a passes the signal constituting the combination of b(mk) and b(mk+km) because of the matching characteristics of the filter with the signal provided on the line 90a. Similarly, the matched filter 86b receives signals on a line 90b. One of the signals may correspond to a combination of b (mk+1) and b(mk+km+1). When the signal received from the transmitter constitutes a combination of b (mk+1) and b (mk+km+1), the filter 86b passes the signal because of the matching characteristics of this filter with the signal provided on the line 90b. The magnitudes of the signals passing through the matched filters 86a, 86b . . . 86n are compared in a comparator 88. A microprocessor 90 receives the signals from the comparator 88 and selects in a stage 92 the signals with the greatest magnitude from the matched filters 86a, 86b . . . 86n. The signal passing through the selected one of the matched filters 86a . . . 86n at each instant is despread in a despreader 94 and demodulated in a demodulator 96 in a manner similar to that described for the embodiment shown in FIG. 4.

Figure 6:
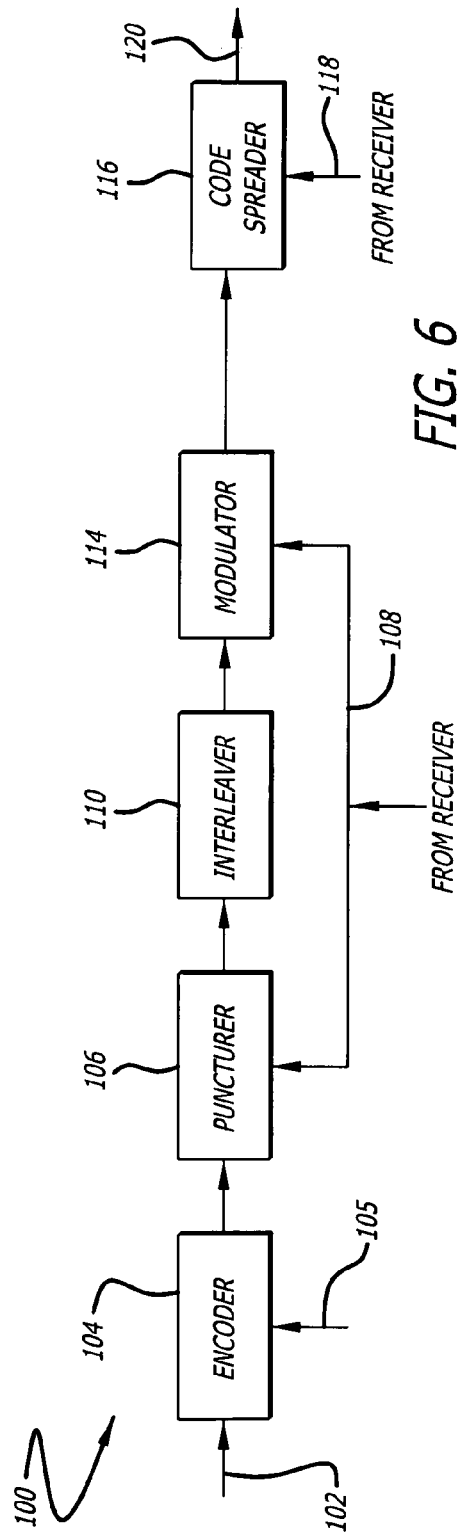
FIG. 6 is a circuit diagram of an expanded system constituting a preferred embodiment of the invention, and preferably incorporating any of the systems shown in FIGS. 1–3, for transmitting data in any of the novel formats of FIGS. 1–3 to the receiver.

FIG. 6 shows a transmitter, generally indicated at 100, in a schematic block form. The transmitter 100 is included in a preferred embodiment of the invention. The transmitter 100 can include features of the transmitter shown in any one of FIGS. 1–3 and described above. The data bits are introduced through a bus 102 to an encoder 104 for encoding channels. For example, the channel encoder may provide an encoding for K channels in accordance with equation (3) set forth above. The encoder 104 may be a convolutional or turbo type of encoder. Instructions on a line 105 from the receiver shown in FIG. 7 determine the encoding of the channels. A channel encoder corresponding to the channel encoder 104 is known in the prior art but not in the combination shown in FIG. 6 and not for the purposes set forth in this application.

The output from the channel encoder 104 passes to a puncturer 106. A puncturer corresponding to the puncturer 106 is known in the prior art but not for purposes set forth in this application and not in the combination shown in FIG. 6. The puncturer 106 deletes some of the output from the channel encoder 104 to provide for the transmission of data at an efficient and effective code rate. When the code rate of the encoder 104 is $R_c = k/n$ and 1 coded bits are punctured out of each (n) (P) coded bits, the effective code rate is $R_c = (KP)(nP-1)$. The puncturing may be provided at the transmitter in accordance with instructions from the receiver. The instructions may be provided through a bus 108. In the above equation, K is derived from equation (3).

After puncturing, the coded bits are interleaved as at 110. Interleaving is known in the prior art. The interleaved bits are then mapped into an individual one of the modulation symbols in the selected modulation scheme. This may be provided in accordance with the system shown in FIG. 3 and described above. In mapping the interleaved output bits, Gray labeling may be used. The interleaved data is then modulated as at 114. The data modulations may be provided in accordance with instructions from the receiver. The data modulations may be provided through the bus 108.

The data modulation may consist of M subsets which are orthogonal to one another and each subset may have V original points. The modulation may be selected from a number of different modes including QPSK, QAM and SQAM. The selection of the puncturing and modulation schemes is based upon the channel condition information fed back by the receiver and other sources (for example, other base stations in the cellular radio system). Each modulation symbol may be produced at a rate $R_S$ with a period of $T_S = 1/R_S$. Each modulation may be spread by a spreader 116 such as the spreader shown in FIG. 3 and described above. The spreading may be by an orthogonal sequence of a length $N_C$. The spreading code may be provided through a bus 118. The output from the spreader 116 is provided on a bus 120.

Each modulation symbol may be spread by an orthogonal sequence of a length $N_C$. The chip rate Rchip has a fixed value (Nc)(Ks) to provide the transmitted signal with a substantially constant bandwidth. The maximum length of the spreading sequence may be denoted as Nc, max. Thus, the data rate R is $$Rb = (Rce)\log_2(LM)(Rchip)/NC$$

$$Rb = (Rcc)\log_2(VM)Rchip/Nc)$$

The determination of the spread factor (Nc) of the spread code is based upon the delay spread observed at the receiver. (Nc) is chosen to be sufficiently large to avoid inter-symbol interference (ISI) caused by the delay spread of the multipath fading channel. As previously described, multipath fading channels occur when the data transmitted from the transmitter to the receiver also reaches the receiver through paths other than directly from the transmitter to the receiver. These indirect paths can produce inter-symbol interference (ISI) and can cause fading of the data transmitted directly from the transmitter to the receiver.

Although the individual ones of the stages shown in FIG. 6 are known in the prior art, the combination of the stages shown in FIG. 6 is not believed to be known in the prior art. Furthermore, the combination of stages shown in FIG. 3 and described above is not believed to be known in the prior art. This is particularly true when the combination of stages shown in Figure is used as the modulator 114 and the spreader 116 in FIG. 6. The combination of stages shown in FIGS. 1 and 2 can also be used as the modulator 114 and the spreader 116 in FIG. 6. In addition, although the puncturer 106 and the interleaver 108 provide advantages in the construction and operation of the transmitter 100 shown in FIG. 6, they can be removed from the transmitter without departing from the scope of the invention.

Figure 7:
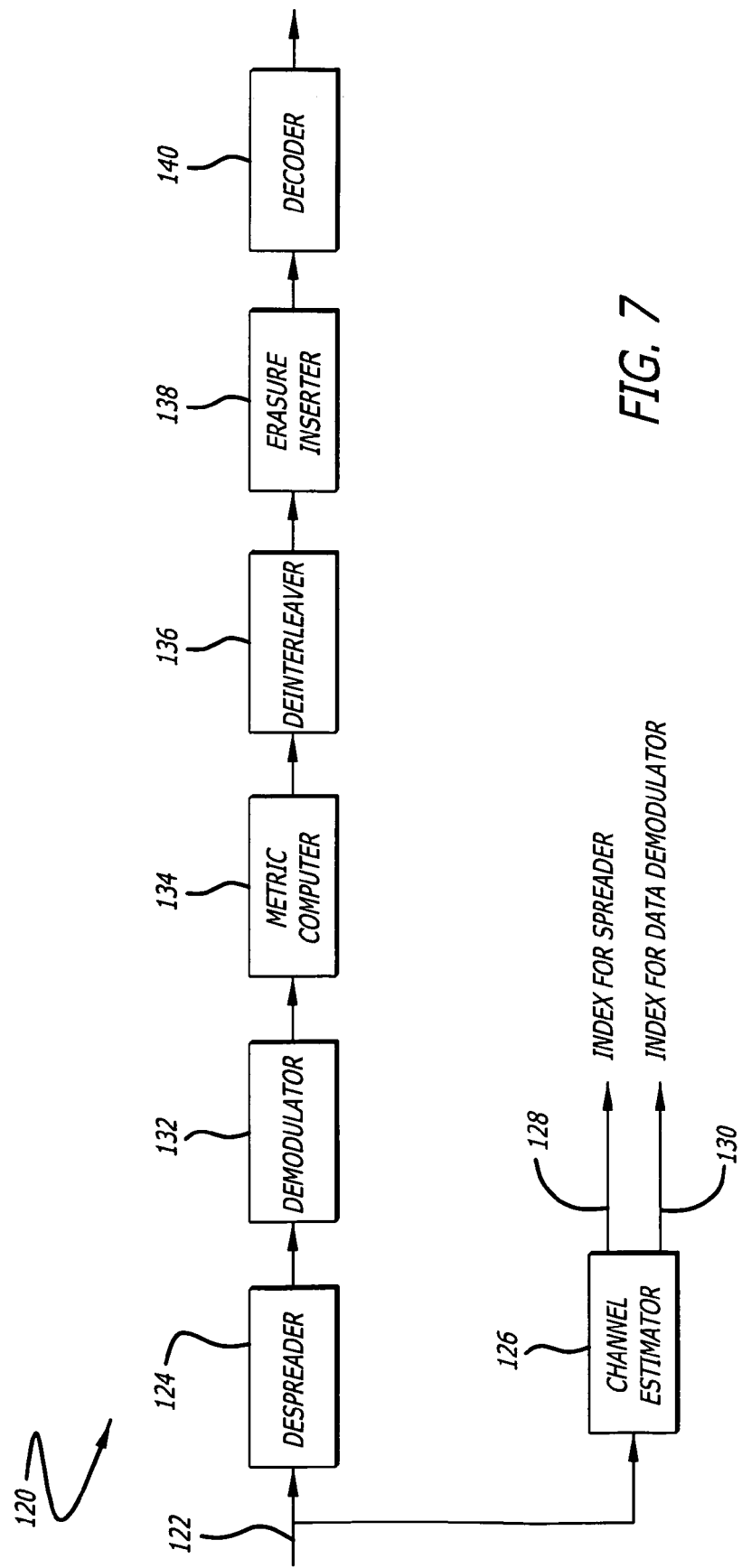
FIG. 7 is a circuit diagram of an expanded system constituting a preferred embodiment of the invention, and preferably incorporating either of the systems shown in FIGS. 4 and 5, for receiving the data in the novel format from the transmitter shown in FIG. 6 and for recovering the data.

FIG. 7 is a schematic block diagram of a receiver, generally indicated at 120, which can be used with the transmitter 100 shown in FIG. 6. The signals received by the receiver 120 are introduced to a bus 122 which is connected to a despreader 124. The construction of a despreader such as the despreader 124 is known in the prior art but not in the combination as shown in FIG. 7 and not for the purposes set forth in this application The despreader 124 eliminates the effects of the spread codes introduced to the modulated data at the transmitter such as the spreader 116 in FIG. 6. The despreader 124 may operate in accordance with the instructions introduced from the receiver to the spreader 116 in FIG. 6.

The signals on the bus 122 are also introduced to a channel estimator 126 which estimates the characteristics of the channel in which the signals have been transmitted to the receiver. For example, the channel estimator 126 may operate in accordance with the value K, the number of channels specified in accordance with equation (3) specified above. The signals from the channel estimator 126 pass to lines 128 and 130. The line 128 provides the index for the spreading provided by the spreader 116 in FIG. 6. The line 130 provides the index for the data modulations provided by the data modulator 114 in FIG. 6.

After the received signals have been despread by the despreader 124, the modulations in the data are then removed in a demodulator 132. The demodulator 132 eliminates the modulations in the data in accordance with the instructions introduced from the receiver to the data modulator 114 in FIG. 6. The demodulated data may then be introduced to a metric computer 134 which processes the data into a metric form and introduces the processed data to a deinterleaver 136.

The deinterleaver 136 restores the data to the form in which it existed before it was introduced to the puncturer 106 in FIG. 6. A stage 138 designated as erasure inserter in FIG. 7 restores the data to the form in which it existed before it was introduced to the puncturer 106 in FIG. 6. A decoder 140 in FIG. 7 restores the data to the form in which it was introduced to the channel encoder 104 in FIG. 6.

Individual ones of the despreader 124, the demodulator 132, the metric computer 134, the deinterleaver 136, the erasure insertion stage 138 and the decoder 140 are known in the prior art but the combination shown in FIG. 7 is not believed to be known in the prior art. Furthermore, the combination is not known in the prior art for the purposes set forth in this application When the puncturer 106 and/or the interleaver 108 are not included in the transmitter shown in FIG. 6, the deinterleaver 136 and/or the erasure insertion stage 138 will not be included in the receiver shown in FIG. 7.

Assume that a block or packet of data spans a time duration of $T_B$ and that the block or packet of data is transmitted by the transmitter 100 to the receiver 120 at successive instants of time. Assume also that the time interval between consecutive transmitted blocks or packets is $T_{FD}$. The time interval $T_{FD}$ may correspond to the delay in the feedback from the receiver 120 to the transmitter 100 of information relating to the channel conditions. As previously indicated, the signal received by the receiver 120 from the transmitter 100 are processed to decode the transmitted data bits and recover the transmitted data. The received signal is also used to estimate the local average of the channel conditions. The term "local average" is intended to mean that averaging is provided over the time span of $T_B$, the duration of a block or packet of data.

The relative speed between the movements of the transmitter 100 and the receiver 120 helps to determine the dynamics of the channel conditions. At a low speed of relative movements between the transmitter 100 and the receiver 120, the channel condition can be almost constant over a time duration of $T_B$ or even over a multiple number of time durations of $T_B$. At a high speed of relative movements between the transmitter 100 and the receiver 120, the channel condition can fluctuate many times over a wide range of values over the same time period of $T_B$ or a multiple number of time durations of $T_B$.

The characteristics of the time-varying multipath fading channels include the local average of signal-to-noise ratio (SNR), where noise represents all of the components other than the desired signal, delay spread and variability of the desired signal amplitude level among other things. The amount of the delay spread determines the level of inter-symbol interference (ISI) and cross interference between the transmitted orthogonal signal components. In the preferred embodiments of this invention, increasing the spreading factor can reduce the level of the inter-symbol interference (ISI). Furthermore, it also enhances the capability of suppressing interference of the transmitted spread spectrum signal and helps to maintain the orthogonality between the transmitted signals. It also has an effect of lengthening the duration of the modulation symbols. Spreading factor can be defined as the ratio between the chip rate of the spreading codes and the rate of the data modulations.

Thus, depending upon the level of the delay spread observed in the spreading codes, the spreading factor is selected to provide sufficient protection against the inter-symbol interference (ISI) and against the cross interference. This will simplify the processing complexity of the receiver signal by avoiding equalization or other techniques of interference suppression. Assuming-that the spreading factor selected is sufficiently large to suppress the delay spread efforts of the multipath fading channel, the channel characteristic observed at the receiver 120 after despreading can be modeled by a flat fading channel. The performance at the receiver will accordingly depend upon the local average signal-to-noise ratio (SNR) and the variance of the desired signal level. The optimal combination of code rate (or puncturing) and the scheme of the data modulations is determined based upon the two (2) aspects of the channel characteristics.

This invention provides for a combination of a channel code rate, data modulation and spreading code. This combination is provided to enhance the spectral efficiency achievable even with the deteriorations resulting from multipath fading channels. A set of orthogonal spreading sequences may be used for spreading, and a determination of the spreading factor (or processing gain) is made based upon the channel impulse response to provide sufficient protection against the channel effects, such as delay spread, of multipath fading.

Different channel code rates may be obtained by puncturing simple basic convolutional or turbo code so that a single decoder can be used for different combinations of code rate and data modulation. After selecting the spreading factor, channel code rate and data modulation are determined based on local average channel conditions instead of instantaneous channel conditions. Then the number of orthogonal spreading sequences is determined based on the user's data rate specification.

By selecting spreading factor, code rate and data modulation, targeted data rate can be achieved by using a minimal amount of radio resources under time-varying channel conditions. In adapting spreading factor, code rate and data modulation, it is important to realize that feedback delay in having the receiver inform the transmitter of channel conditions will be unavoidable. Because of this, it is important to realize that adaption by the system shown in FIGS. 6 and 7 should be based upon local average channel conditions. This provides for a successful adaptation by the system shown in FIGS. 6 and 7. It should also be appreciated that the system should also be based upon local average channel conditions when the transmitter 100 shown in FIG. 6 is adapted to incorporate any of the systems shown in FIGS. 1–3 and/or when the receiver 120 shown in FIG. 2 is adapted to incorporate either of the systems shown in FIGS. 4 and 5.

Solely relying on either one of the two (2) techniques of data modulation and spreading code to provide communication services at high data rates will cause the system to be inefficient or make the modem implementation inordinately complicated. By combining channel encoding, direct sequence spreading and adaptive coded modulation, high data rate wireless communication services can be provided reliably and efficiently.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. A method of transmitting data from a transmitter to a receiver, including the steps of:
   providing a channel encoding of the information data,
   providing a mapping of the channel encoded data,
   providing a plurality of modulations of the mapped data in each of a plurality of M data modulation sequences,
   providing a plurality of spreading codes in each of a plurality of N spreading code sequences, selecting an individual one of the data modulations in each M data modulation sequence and an individual one of the spreading codes in each N spreading code sequence, combining the selected one of the data modulations in each M data modulation sequence and the selected one of the spreading codes in each N spreading code sequence, and transmitting to the receiver the combination of the selected one of the data modulations in each M data modulation sequence and the selected one of the spreading codes in each N spreading code sequence.

2. A method as set forth in claim 1 wherein the combination constitutes the product of the selected one of the M data modulations in each data modulation sequence and the selected one of the N spreading codes in each spreading code sequence.

3. A method as set forth in claim 1 wherein the data modulations are produced in first sequences and the spreading codes are produced in second sequence and wherein the sequences of the data modulations and the sequences of the spreading codes are alternately provided and wherein the M data modulations in each of the first sequence and the spreading codes in each of the alternately provided sequences of the spreading codes are paired in parallel and wherein an individual one of the data modulations in the first sequences and an individual one of the spreading codes in the alternately provided sequences in each parallel pair of sequences are selected for combination.

4. A method as set forth in claim 1 wherein the combination constitutes the product of the selected one of the M data modulations in each data modulation sequence and the selected one of the N spreading codes in the spreading code sequence.

5. A method of transmitting data and receiving the data, including the steps of:

providing data modulations in sequences each having M data modulations where M indicates the number of data modulations in each sequence, providing spreading codes in sequences each having N spreading codes where N indicates the number of spreading codes in each sequence, the sequences of the N spreading codes being provided alternately with the sequences of the M data modulations, selecting an individual one of the M data modulations in each sequence of the data modulations, selecting an individual one of the N spreading codes in each spreading code sequence, and combining the selected one of the M data modulations in each M data modulation sequence and the selected one of the N spreading codes in each N spreading code sequence.

6. A method as set forth in claim 5 wherein the combination of the selected one of the M data modulations in each sequence of the data modulations and the selected one of the N spreading codes in the next alternate one of the spreading code sequences is transmitted from the transmitter to the receiver.

7. A method as set forth in claim 5 wherein the combination constitutes the product of the selected one of the data modulations in each data modulation sequence and the selected one of the N spreading codes in each spreading code sequence.

8. A method as set forth in claim 5, including the steps of:

providing at the receiver successive combinations of the selected one of the M data modulations in each data modulation sequence and the selected one of the N spreading codes in each alternate sequence of the spreading codes, and identifying the combinations received at the receiver of the selected one of the M data modulations in each data modulation sequence and the selected one of the N spreading codes in each N spreading code sequence.

9. A method as set forth in claim 8, including the step of:

demodulating the data modulations in each received combination after the identification of the received combination.

10. A method as set forth in claim 8 wherein each combination of the selected data modulation in each M data modulation sequence and the selected spreading code in each N spreading code sequence is subjected to correlation factors to identify the combination and wherein the spreading code in each received combination is despread after the identification of the received combination and wherein each received combination of the modulated data in each M data modulation sequence and the spreading code in each N spreading code sequence is demodulated after being despread.

11. A method as set forth in claim 8, the step of:

despreading the spreading code in each received combination after the identification of the received combination.

12. A method as set forth in claim 11 wherein each combination of the selected data modulation in the data modulation sequence and the selected spreading code in the spreading code sequence is passed through a plurality of matching filters, each having individual characteristics, to identify the characteristics of the combination in accordance with the characteristics of the filter through which the combination passes and wherein the spreading code in each received combination is despread after the identification of the combination and wherein each data modulation in each combination is demodulated after the combination is despread.

13. A method as set forth in claim 5 wherein the selected one of the M data modulations in each data modulation sequence and the selected one of the N spreading codes in the next alternate sequence of the spreading codes are in parallel and wherein the combining is defined by the product of the selected one of the M data modulations in each data modulation sequence and the selected one of the N spreading codes in the next alternate sequence of the spreading codes in parallel.

14. A method as set forth in claim 13, including the steps of providing at the receiver successive combinations of the selected one of the M data modulations in each data modulation sequence and the selected one of the N spreading codes in the next alternate sequence of the spreading codes, and identifying the combination received at the receiver of the selected one of the M data modulations in each data modulation sequence and the selected one of the N spreading codes in each next alternate sequence of the spreading codes.

15. A method as set forth in claim 14 wherein
each combination of the selected data modulation in each data modulation sequence and the selected spreading code in each spreading code sequence is subjected to correlation factors to identify the combination and wherein
the spreading code in each received combination is despread after the identification of the received combination and wherein
each received combination of the modulated data and the spreading code is demodulated after being despread.

16. Apparatus as set forth in claim 15 wherein
the combining of the selected one of the data modulations in each data modulation sequence and the selected one of the spreading codes in each spreading code sequence constitutes the product of the selected one of the data modulations in each data modulation sequence and the selected one of the spreading codes in each spreading code sequence.

17. In a method of receiving and processing data from a transmitter, the steps of:
receiving at a receiver signals transmitted from the transmitter and constituting a combination of a selected one of M data modulations in a data modulation sequence and a selected one of N spreading codes in a spreading code sequence where M indicates the number of the data modulations in the data modulation sequence and N indicates the number of the spreading codes in the spreading code sequence,
identifying, from the different combinations of the M data modulations in the data modulation sequence and the N spreading codes in the spreading code sequence, the combination of the selected one of the M data modulations in the data modulation sequence and the selected one of the N spreading codes in the spreading code sequence, and
despreading and demodulating the combination of the selected one of the M data modulations in the data modulation sequence and the selected one of the N spreading codes in the spreading code sequence.

18. In a method as set forth in claim 17 wherein
matched filter techniques are used to identify, from the combinations of the M data modulations in the data modulation sequence and the N spreading codes in the spreading code sequence, the combination of the selected one of the M data modulations in the data modulation sequence and the selected one of the N spreading code in the spreading code sequence.

19. In a method as set forth in claim 17 wherein
correlation techniques are used to identify, from the combinations of the M data modulations in the data modulation sequence the N spreading codes in the spreading code sequence, the combination of the selected one of the M data modulations in the data modulation sequence and the selected one of the N spreading codes in the spreading code sequence.

20. In a method as set forth in claim 19 wherein
the received data is multiplied by each individual one of the N spreading codes in the correlation techniques and wherein
the individual ones of the products are integrated with time and wherein
the individual ones of the integrated products are squared and wherein
the combination of the selected one of the M data modulations in each data modulation sequence and the selected one of the spreading code in each spreading code sequence is identified by the highest value in the squaring of the integrated products.

21. In a method as set forth in claim 17 wherein
the combination of the selected one of the M data modulations in each data modulation sequence and the selected one of the N spreading codes in each spreading code sequence constitutes the product of the selected one of the M data modulations in each data modulation sequence and the selected one of the N spreading codes in each spreading code sequence.

22. In a method as set forth in claim 21 wherein
correlation techniques are used to identify, from the combinations of the M data modulations in each data modulation sequence and the N spreading codes in each spreading code sequence, the combination of the selected one of the M data modulations in each data modulation sequence and the selected one of the N spreading codes in each spreading code sequence
the received data is multiplied by each individual one of the N spreading codes in the correlation techniques and wherein
the individual ones of the products are integrated with time and wherein
the individual ones of the integrated products are squared and wherein
the combination of the selected one of the M data modulations in each data modulation sequence and the selected one of the spreading code in each spreading code sequence is identified by the highest value in the squaring of the integrated products.

23. A method of transmitting data from a transmitter to a receiver, including the steps of:
encoding data in accordance with instructions from the receiver,
puncturing the data in accordance with instructions from the receiver,
interleaving the punctured data,
modulating the interleaved punctured data with a selected one of M data modulations in each of a plurality of data modulation sequence in accordance with instructions from the receiver,
spreading the modulated interleaved punctured data by a selected one of N spreading codes in each of a plurality of spreading code sequence in accordance with instructions from the receiver,
combining the selected one of the M data modulations in the data modulation sequence and the selected one of the N spreading codes in the spreading code sequence, and
transmitting to the receiver the modulated interleaved punctured data spread by the selected spreading code in each of the plurality of spreading code sequences.

24. A method as set forth in claim 23 wherein
the spreading codes are in sequences each having N spreading codes and wherein
an individual one of the M data modulations is selected in each data modulation sequence and wherein
the spreading code sequences alternate with the data modulation sequences and wherein
an individual one of the N spreading codes is selected in each spreading code sequence and wherein
the selected one of the M data modulations in each data modulation sequence and the selected one of the N spreading codes in each spreading code sequence are combined and wherein
the combination of the selected one of the M data modulations in each data modulation sequence and the selected one of the N spreading codes in each alternate spreading code sequence is transmitted to the receiver.

25. A method as set forth in claim 24 wherein
the selected one of the M data modulations in each data modulation sequence and the selected one of the N spreading codes in each spreading code sequence are provided in parallel to obtain the combination and wherein
the combination of the selected one of the M data modulations in each data modulation sequence and the selected one of the N spreading codes in each alternate spreading code sequence is provided by multiplying the selected one of the M data modulations and the selected one of the N spreading codes.

26. A method as set forth in claim 25 wherein
the selected one of the M data modulations in each data modulation sequence and the selected one of the N spreading codes in each alternate spreading code sequence are provided in parallel and wherein
the selected one of the M data modulations in each data modulation sequence and the selected one of the N spreading codes in each spreading code sequence are selected with the M data modulations and the N spreading codes in parallel.

27. A method of transmitting data and receiving the data at a receiver, including the steps of:
providing the data at the transmitter,
providing sequence of M data modulations on a reiterative basis in accordance with instructions from the receiver where M indicates the number of the data modulations in the sequence,
providing sequence of N spreading codes on a reiterative basis in accordance with instructions from the receiver where N indicates the number of the spreading codes in the sequence,
alternately providing the sequences of the M data modulations and the sequences of the N spreading codes on a reiterative basis,
pairing in parallel on a reiterative basis successive ones of the sequences of the M data modulations and the sequences of the N spreading codes,
selecting from each parallel pair on a reiterative basis an individual one of the M data modulations in each data modulation sequence and an individual one of the N spreading codes in each spreading code sequence,
obtaining the product on a reiterative basis of the selected one of the M data modulations and the selected one of the N spreading codes in each parallel pair, and
transmitting to the receiver the product of the selected one of the M data modulations and the selected one of the N spreading codes in each parallel pair.

28. A method as set forth in claim 27, including the step of:
encoding the data at the transmitter, in accordance with instructions from the receiver, before the data is modulated.

29. A method as set forth in claim 27, including the step of:
puncturing the data at the transmitter, in accordance with instructions from the receiver, before the data is modulated and combined with the spreading code to obtain the product.

30. A method as set forth in claim 27, including the step of:
puncturing the data at the transmitter, in accordance with instructions from the receiver, to delete particular data before the data is modulated and combined with the spreading code to obtain the product, and
depuncturing the data at the receiver, in accordance with the instructions from the receiver, to restore the data punctured at the transmitter.

31. A method as set forth in claim 27, including the steps of:
puncturing the data at the transmitter, in accordance with instructions from the receiver, before the data is modulated and combined with the spreading code to obtain the product, and
interleaving the punctured data at the transmitter before the data is modulated and combined with the spreading code to obtain the product.

32. A method as set forth in claim 27, including the steps of
receiving at the receiver the product of the selected one of the M data modulations and the selected one of the N spreading codes in each parallel pair, and
identifying the product of the selected one of the M data modulations and the selected one of the N spreading codes in each parallel pair.

33. A method as set forth in claim 32, including the step of:
demodulating at the receiver the selected one of the M data modulations, in each identified product in accordance with instructions from the receiver to recover the data in the product.

34. A method as set forth in claim 32, including the step of:
despreading at the receiver the individual one of the N spreading codes in each identified product, in accordance with instructions from the receiver, to recover the data in the product.

35. A method as set forth in claim 32, including the steps of,
encoding the data at the transmitter, in accordance with instructions from the receiver, before the data is modulated and is combined with the spreading code to obtain the product, and
decoding the received product of the selected one of the M data modulations and the selected one of the N spreading codes in each parallel pair.

36. A method as set forth in claim 32, including the steps of:
puncturing the data at the transmitter in accordance with instructions from the receiver, to delete particular data before the data is modulated and combined with the spreading code to_obtain the product,
despreading at the receiver the identified product of each parallel pair of the selected one of the M data modulations and the selected one of the N spreading codes in each parallel pair,
demodulating at the receiver the despread data at the receiver, and
re-inserting at the receiver the punctured data into the demodulated data to recover the data.

37. A method as set forth in claim 32, including the steps of;
puncturing the data at the transmitter, in accordance with instructions from the receiver, to delete particular data before the data is modulated and is combined with the spreading code to obtain the product,
interleaving the punctured data at the transmitter before the data is modulated and combined with the spreading code to obtain the product, de-interleaving the punctured data at the receiver after the selected one of the M data modulations and the selected one of the N spreading codes in each parallel pair has been identified, and re-inserting the punctured data, in accordance with instructions from the receiver, before the decoding of the data but after the de-interleaving of the data.

38. A method as set forth in claim 37, including the steps of:

despreading at the receiver the selected one of the N spreading codes in each identified combination, in accordance with instructions from the receiver, to recover the data in the product, and demodulating at the receiver the selected one of the M data modulations in each identified combination, in accordance with instructions from the receiver, to recover the data in the product.

39. In a method of receiving and processing data from a transmitter, the steps of:

receiving at a receiver from the transmitter modulated interleaved punctured data spread by a particular spreading code, de-spreading the received data in accordance with instructions provided by the receiver to the transmitter to obtain the spreading of the data at the transmitter, the modulated interleaved punctured data constituting a product of modulated data selected from M data modulations in a data modulation sequence and a spreading code selected from N spreading codes in an N spreading code sequence where M is the number of the data modulations in the sequence and N is the number of the spreading codes in the sequence, demodulating the modulated data in accordance with instructions provided by the receiver to the transmitter to modulate the data at the transmitter, de-interleaving the demodulated data, re-inserting the punctured data into the de-interleaved data in accordance with instructions provided by the receiver to the transmitter to obtain the puncturing of the data at the transmitter, and decoding the data, after the re-insertion of the punctured data into the de-interleaved data, to recover the data.

40. In a method as set forth in claim 39 wherein the data received at the receiver from the transmitter constitutes a combination of a selected one of M data modulations in a data modulation sequence and a selected one of N spreading codes in a spreading code sequence where M is the number of the data modulations in the data modulation sequence and N is the number of the spreading codes in the spreading code sequence, the step of:

identifying, from the M data modulations in each data modulation sequence and the N spreading codes in each spreading code sequence, the selected one of the M data modulations in the data modulation sequence and the selected one of the N spreading codes in the spreading code sequence, the identification occurring before the demodulation and the de-spreading of the received data.

41. Apparatus for transmitting data from a transmitter to a receiver including:

a bus for providing successive sequences of M data modulations and successive sequences of N spreading codes where M is the number of the data modulations in each data modulation sequence and N is the number of the spreading codes in each spreading code sequence, a converter for converting each of the successive sequences of the M data modulations and the N spreading codes to a parallel presentation of the M data modulations in each data modulation sequence and the N spreading codes in each successive spreading code sequence, a first selector for selecting an individual one of the M data modulations in each of the parallel presentations, a second selector for selecting an individual one of the N spreading codes in each of the parallel presentations, a multiplier for combining the selected one of the M data modulations in each parallel presentation and the selected one of the N spreading codes in the parallel presentation, and a transmitter for transmitting the multiplied combination of the selected one of the M data modulations and the selected one of the spreading codes in each of the parallel presentations.

42. Apparatus as set forth in claim 41, including an interleaver for interleaving the encoded data.

43. Apparatus as set forth in claim 41, including a stage for puncturing the data in the successive sequences in accordance with instructions from the receiver before the introduction of the M data modulations and the N spreading codes to the converter.

44. Apparatus as set forth in claim 41, including the M data modulations introduced to the converter in each data modulation sequence being provided in accordance with instructions from the receiver, the N spreading codes introduced to the converter in each spreading code sequence being provided in accordance with instructions from the receiver.

45. Apparatus as set forth in claim 41, including a stage for interleaving the data in the successive sequences in accordance with instructions from the receiver before the introduction of the M data modulations in each data modulation sequence and the N spreading codes in each spreading code sequence to the converter.

46. Apparatus as set forth in claim 41, including the modulator modulating the data with sequences of M data modulations in accordance with instructions from the receiver, the code spreader spreading the data with sequences of N spreading codes in accordance with instructions from the receiver, the modulator and the code spreader being operative before the selections provided by the first and second selectors.

47. Apparatus as set forth in claim 41, including an encoder for encoding the successive sequences of the data before the modulation of the data with the M data modulations in each sequence and before the spreading of the modulated data with the N spreading codes in each sequence.

48. Apparatus as set forth in claim 47, including a stage for puncturing the data in the successive sequences before the introduction of the M data modulations in each data modulation sequence and the N spreading codes in each spreading code sequence to the converter, a stage for interleaving the data in the successive sequences before the introduction of the M data modulations in each data modulation sequence and the N spreading codes in each spreading code sequence to the converter, a modulator for modulating the data in the sequences of the M data modulations in accordance with instructions from the receiver, a code spreader for spreading the data in the sequences of the N spreading codes in accordance with instructions from the receiver, the modulator and the code spreader being operative before the selections provided by the first and second selectors, and the transmitter being operative to transmit the combination of the selected one of the M data modulations in each of the successive data modulation sequences and the selected one of the N spreading codes in each of the successive spreading code sequences.

49. Apparatus for transmitting data from a transmitter to a receiver, including, an encoder for providing coded channels identifying relative locations of the data, a modulator for providing sequences of M data modulations in accordance with instructions from the receiver where M is the number of the data modulations in each data modulation sequence, a code spreader for providing sequences of N spreading codes in accordance with instructions from the receiver where N is the number of the spreading codes in each spreading code sequence and where the sequences of the N spreading codes are juxtaposed to the sequences of the M data modulations, a converter for converting to a parallel relationship each of the successive encoded sequences of the M modulated data and each of the juxtaposed sequence of the N spreading codes, a first selector of an individual one of the M data modulations in each data modulation sequence, a second selector of an individual one of the N spreading codes in the juxtaposed spreading code sequence, and a stage for combining on a reiterative basis the selected one of the M data modulations in each data modulation sequence and
the selected one of the N spreading codes in the juxtaposed spreading code sequence to produce resultant signals, and a stage for transmitting the resultant signal in each data modulation sequence and spreading code sequence to the receiver.

50. Apparatus as set forth in claim 49, including a stage for removing particular ones of the data sequences, before the modulation of the data with the M data modulations and before the spreading of the data with the N spreading codes, in accordance with instructions from the receiver.

51. Apparatus as set forth in claim 49, including, a stage for interleaving the data in the sequences before the modulation of the data with the M data modulations in each data modulation sequence and before the spreading of the data with the N spreading codes in each spreading code sequence.

52. Apparatus as set forth in claim 49, including, a converter for converting the M data modulations in each data modulation sequence and the N spreading codes in the juxtaposed spreading code sequence to a parallel presentation, the first and second selectors being operative after the conversion of the M data modulations in each data modulation sequence and the conversion of the N spreading codes in the juxtaposed spreading code sequence to the parallel presentation.

53. Apparatus for providing a transmission of data from a transmitter to a receiver, including a bus for providing data, a modulator for modulating the data each with sequences of M data modulations where M is the number of the data modulations in each sequence, and a spreader for spreading the modulated data, each with sequences of spreading codes where N is the number of the spreading codes in each spreading code sequence, a converter for converting the M data modulations in each data modulation sequence and the N spreading codes in each spreading code sequence to a parallel presentation where each sequence of the M data modulations is juxtaposed with an individual one of the sequences of the N spreading codes, a first selector for selecting an individual one of the M data modulations in each parallel presentation, a second selector for selecting an individual one of the N spreading codes in each parallel presentation, and a stage for combining the selected one of the M data modulations in each parallel presentation and the selected one of the N spreading codes in the parallel presentation.

54. Apparatus as set forth in claim 53 wherein the M data modulations in each data modulation sequence are provided in accordance with instructions from the receiver and wherein the N spreading codes in each juxtaposed spreading code sequence are provided in accordance with instructions from the receiver and wherein the combination of the selected one of the data modulations in each parallel presentation and the selected one of the N spreading codes in the parallel presentation constitutes the product of the data modulation and the spreading code.

55. Apparatus as set forth in claim 53, including a transmitter for transmitting to the receiver the product of the selected one of the M data modulations and the selected one of the N spreading codes in each parallel presentation.

56. Apparatus as set forth in claim 53 wherein a puncturer is provided to remove data in the sequences, before the modulation of the data with the M data modulations in each data modulation sequence and before the spreading of the data with the N spreading codes in the juxtaposed spreading code sequence, in accordance with instructions from the receiver.

57. Apparatus as set forth in claim 53 wherein an encoder provides channel coding to the data in the sequences before the modulation of the data with the M data modulations in each data modulation sequence and before the spreading of the data with the N spreading codes in each spreading code sequence.

58. Apparatus as set forth in claim 53 wherein the M data modulations in each data modulation sequence are provided in accordance with instructions from the receiver and wherein the N spreading codes in each spreading code sequence are provided in accordance with instructions from the receiver and wherein a puncturer is provided to remove data in each sequence, before the modulation of the data in each sequence with the M data modulations and before the spreading of the data in the juxtaposed sequence with the N spreading codes, in accordance with instructions from the receiver and wherein an encoder provides channel coding to the data in the sequences before the modulation of the data in each data modulation sequence with the M data modulations and before the spreading of the data in the juxtaposed spreading code sequence with the N spreading codes.

59. Apparatus for receiving and processing data from a transmitter, including
a bus for receiving transmitted data representing a combination of an individual one of M data modulations in a data modulation sequence and an individual one of the N spreading codes in a spreading code sequence juxtaposed to the sequence of the M data modulations where M is the number of the data modulations in the data modulation sequence and N is the number of the spreading codes in the spreading code sequence,
a plurality of matched filters disposed in a parallel relationship, each of the filters providing characteristics corresponding to a combination of the individual one of the M data modulations in the data modulation sequence and the individual one of the N spreading codes in the spreading code sequence and each operative to receive the data on the bus and to provide an output dependent upon the matching between the characteristics of the filter and the characteristics of the data on the bus, and
a comparator responsive to the output of the matched filters for comparing the magnitude of the outputs from the matched filters in the plurality to select the output with the highest magnitude.

60. Apparatus as set forth in claim 59 wherein the data has been spread by the N spreading codes in the sequence in accordance with instructions from the receiver; the apparatus including:
a de-spreader at the receiver for removing the spreading codes in the data.

61. Apparatus as set forth in claim 59 wherein the data has been modulated by the M data modulations in the sequence on a reiterative basis in accordance with instructions from the receiver, the apparatus including:
a demodulator at the receiver for removing the modulations in the data.

62. Apparatus as set forth in claim 59 wherein the data has been punctured in a particular pattern at the transmitter, in accordance with instructions from the receiver, to eliminate portions of the data, the apparatus including:
a de-puncturer for restoring at the receiver the portions of the data eliminated at the transmitter.

63. Apparatus as set forth in claim 59 wherein the data has been interleaved at the transmitter,
the apparatus including
a de-interleaver for de-interleaving the data.

64. Apparatus as set forth in claim 59 wherein the data has been encoded at the transmitter to identify the channels in which the data is provided, the apparatus including:
a decoder at the receiver for eliminating the channel coding.

65. Apparatus as set forth in claim 59 wherein the data has been modulated at the transmitter by the M data modulations in the sequence in accordance with instructions from the receiver and wherein the data has been interleaved at the transmitter and wherein the data has been punctured at the transmitter in accordance with instructions from the receiver and wherein the data has been spread by the N spreading codes in the sequence in accordance with instructions from the receiver the apparatus including:
a despreader at the receiver for removing the spreading codes in the data,
a demodulator at the receiver for demodulating the M data modulations,
a de-interleaver at the receiver for de-interleaving the data,
a de-puncturer at the receiver for depuncturing the data, and
a decoder at the receiver for decoding the encoded data.

66. Apparatus for receiving data from a transmitter, including
a bus for receiving transmitted data representing a combination of an individual one of M data modulations in a data modulation sequence and an individual one of N spreading codes in a juxtaposed spreading code sequence where M is the number of the data modulations in the data modulation sequence and N is the number of the spreading codes in the spreading code sequence,
a plurality of multipliers each constructed to combine an individual one of the transmitted data modulations and an individual one of the spreading codes to provide an output representative of the combination,
a plurality of integrators each operatively coupled to an individual one of the multipliers to integrate over a particular period of time the output from the individual one of the multipliers,
a plurality of squaring stages each operatively coupled to the individual one of the integrators for squaring the output of the individual one of the integrators, and
a comparator responsive to the outputs of the squaring stages for selecting the individual one of the squaring stages with the largest output and operatively coupled to the integrators for selecting for its output the output of the individual one of the integrators operatively connected to the individual one of the squaring stages.

67. Apparatus as set forth in claim 66 wherein the data has been modulated by M data modulations in accordance with instructions from the receiver, the apparatus including:
a demodulator for restoring the data to the form at the transmitter before the modulation at the transmitter by the M data modulations.

68. Apparatus as set forth in claim 66 wherein the data has been punctured in a particular pattern at the transmitter, in accordance with instructions from the receiver, to eliminate portions of the data, the apparatus including:
a de-puncturer for restoring at the receiver the portions of the data eliminated at the transmitter.

69. Apparatus as set forth in claim 66 wherein the data has been interleaved at the transmitter,
the apparatus including
a de-interleaver for returning the data at the receiver to the form at the transmitter before the interleaving of the data.

70. Apparatus as set forth in claim 66 wherein the data has been encoded at the transmitter to identify the channels in which the data appears:
the apparatus including:
a decoder for returning the data at the receiver to the form at the transmitter before the encoding of the data by the encoder.

71. Apparatus as set forth in claim 66 wherein the data has been spread by N spreading codes in accordance with instructions from the receiver, the apparatus including:
a de-spreader for restoring the data to the form at the transmitter before the spreading at the transmitter by the N spreading codes.

72. Apparatus as set forth in claim 71 wherein the data has been modulated at the transmitter in accordance with instructions from the receiver and has been interleaved at the transmitter and has been punctured with a particular pattern at the transmitter, in accordance with instructions from the receiver, to eliminate portions of the data and has been encoded at the transmitter, in accordance with instructions from the receiver, to identify channels in which the data is provided, the apparatus including:
- a demodulator at the receiver for restoring the data to the form at the transmitter before the modulation at the transmitter by the M data modulations,
- a de-interleaver at the receiver for returning the data at the receiver to the form at the transmitter before the interleaving of the data,
- a de-puncturer at the receiver for restoring at the receiver the portions of the data eliminated at the transmitter, and
- a decoder for returning the data at the receiver to the form at the transmitter before the encoding of the data by the encoder.

73. A method of transmitting data from a transmitter to a receiver, including the steps of:
- providing successive sequences of a plurality of modulation symbols for the data,
- providing a spreading code for the data,
- providing a parallel presentation of each of the modulation symbols for the data and the spreading code for the data and
- combining each of the parallel presentations to provide signals representative of the presentations,
- selecting the product of successive ones of the modulations in each sequence and the spreading codes with juxtaposed sequences, and
- transmitting the successive ones of the products to the receiver.

74. A method as set forth in claim 73 wherein the combination constitutes the product of each of the modulation symbols for the data and the spreading code for the data.

75. A method of transmitting data from a transmitter to a receiver, including the steps of:
- providing input signals, mapping the input signals with a number of binary bits,
- providing a spreading code,
- modulating the input signals from the mapper with reiterative sequences of M data modulations where M indicates a number of different data modulations,
- selecting each successive one of the M modulations in each reiterative sequence, and
- combining each successive one of the M modulations in each reiterative sequence and the spreading code.

76. A method as set forth in claim 75, including multiplying the combination of each successive one of the M modulations in each reiterative sequence and the spreading code.

77. A method as set forth in claim 76 wherein each successive one of the M data modulations in each reiterative data modulation sequence is presented in parallel with the spreading code and wherein the parallel presentation of each successive one of the M data modulations in each reiterative data modulation sequence and the spreading code is multiplied, and wherein the product of each successive one of the M data modulations in each reiterative data modulation sequence and the spreading code is transmitted to the receiver.

78. In a method of receiving and processing data from a transmitter, the steps of:
- receiving at a receiver signals transmitted from the transmitter and constituting a combination of a selected one of M data modulations in a data modulation sequence and a spreading code where M indicates the number of the data modulations in the sequence,
- identifying, from the combinations of the M data modulations in the data modulation sequence and the spreading code, the combination of each selected one of the M data modulations in the data modulation sequence and the spreading code, and
- despreading and demodulating the combination of each selected one of the M data modulations in the data modulation sequence and the spreading code.

79. In a method as set forth in claim 78 wherein correlation techniques are used to identify, from the combinations of the M data modulations in the data modulation sequence and the spreading code, the combination of each selected one of the M data modulations in the data modulation sequence and the spreading code.

80. In a method as set forth in claim 78 wherein matched filter techniques are used to identify from the combination of the M data modulations in the data modulation sequence and the spreading code, the combination of each selected one of the M data modulations in the data modulation sequence and the spreading code.

81. A method of transmitting data from a transmitter to a receiver, including the steps of:
- encoding data in accordance with instructions from the receiver,
- puncturing the data in accordance with instructions from the receiver,
- interleaving the punctured data,
- modulating the interleaved punctured data with a selected one of M data modulations in a data modulation sequence in accordance with instructions from the receiver where M is the number of data modulation in the data modulation sequence,
- combining each selected one of the M data modulations in the data modulation sequence and a particular spreading code, and
- transmitting the combination of each selected one of the M data modulations in the data modulation sequence and the particular spreading code to the receiver.

82. A method as set forth in claim 81 wherein the combination constitutes the product of each selected one of the M data modulations in the data modulation sequence and the particular spreading code.

83. A method of transmitting data and receiving the data at a receiver, including the steps of:
- providing the data at the transmitter,
- providing a sequence of M data modulations in accordance with instructions from the receiver where M indicates the number of the data modulations in the sequence,
- providing a spreading code in accordance with instructions from the receiver, pairing in parallel successive ones of the M data modulations in each data modulation sequence and the spreading code where M is the number of the data modulations in each data modulation sequence,
- selecting from the parallel pairs in each data modulation sequence an individual one of the pairing of the M data modulations in each data modulation sequence and the spreading code, combining in each data modulation sequence the M data modulation and the spreading code in the selected pair, and transmitting to the receiver in each data modulation sequence the combination of the M data modulation and the spreading code in the selected pair.

84. A method as set forth in claim 83 wherein the combination in each data modulation sequence of the M data modulation and the spreading code in the selected pair constitutes the product in each data modulation sequence of the M data modulation and the spreading code in the selected pair.

85. A method as set forth in claim 84, including the steps of:

receiving at the receiver the product in each data modulation sequence of the M data modulation and the spreading code in the selected pair, and identifying at the receiver the product in each data modulation sequence of the data modulation and the spreading code in the selected pair.

* * * * *

UNITED STATES PATENT AND TRADEMARK OFFICE
CERTIFICATE OF CORRECTION

PATENT NO. : 6,952,439 B1
DATED : October 4, 2005
INVENTOR(S) : William C. Lindsey et al.

It is certified that error appears in the above-identified patent and that said Letters Patent is hereby corrected as shown below:

Column 4,
Line 20, after "quadrants" insert -- ) --.

Column 7,
Line 12, delete "$b_1$ the data modulations" and insert -- $b_1$ = the data modulations --.
Line 14, delete "$(mk+K_m1)$" and insert -- $(mk+K_m+1)$ --.

Column 18,
Line 50, delete "to_obtain" and insert -- to obtain --.

Signed and Sealed this

Twenty-fourth Day of January, 2006

JON W. DUDAS
*Director of the United States Patent and Trademark Office*